US008819379B2

(12) United States Patent
Aho et al.

(10) Patent No.: US 8,819,379 B2
(45) Date of Patent: Aug. 26, 2014

(54) ALLOCATING MEMORY BASED ON PERFORMANCE RANKING

(75) Inventors: Eero T. Aho, Tampere (FI); Kimmo K. Kuusilinna, Tampere (FI); Jari A. Nikara, Lempaala (FI)

(73) Assignee: Memory Technologies LLC, Las Vegas, NV (US)

( * ) Notice: Subject to any disclaimer, the term of this patent is extended or adjusted under 35 U.S.C. 154(b) by 0 days.

(21) Appl. No.: 13/296,367

(22) Filed: Nov. 15, 2011

(65) Prior Publication Data

US 2013/0124815 A1 May 16, 2013

(51) Int. Cl.
*G06F 12/00* (2006.01)
(52) U.S. Cl.
USPC .................................. 711/170; 711/5; 711/104
(58) Field of Classification Search
USPC .............................................. 711/170, 5, 104
See application file for complete search history.

(56) References Cited

U.S. PATENT DOCUMENTS

| | | | | |
|---|---|---|---|---|
| 5,974,576 | A | 10/1999 | Zhu | 714/704 |
| 6,052,134 | A * | 4/2000 | Foster | 345/533 |
| 6,535,966 | B1 | 3/2003 | Cherabuddi et al. | 711/154 |
| 7,872,657 | B1 | 1/2011 | Edmondson et al. | 345/544 |
| 8,285,961 | B2 * | 10/2012 | Sikdar et al. | 711/170 |
| 2004/0088472 | A1 | 5/2004 | Nystuen et al. | 711/5 |
| 2008/0016308 | A1 * | 1/2008 | Bartley et al. | 711/167 |
| 2009/0031314 | A1 * | 1/2009 | Moscibroda et al. | 718/102 |
| 2009/0217273 | A1 | 8/2009 | Mutlu et al. | 718/101 |
| 2010/0241782 | A1 * | 9/2010 | Maddali et al. | 711/5 |
| 2011/0238941 | A1 * | 9/2011 | Xu et al. | 711/169 |
| 2011/0258353 | A1 * | 10/2011 | Wang | 710/110 |

FOREIGN PATENT DOCUMENTS

| | | |
|---|---|---|
| EP | 1 622 391 A1 | 2/2006 |
| GB | 2466264 A | 6/2010 |
| JP | 10207850 A * | 8/1998 |
| WO | WO-2006/017135 A2 | 2/2006 |

OTHER PUBLICATIONS

Chang Joo Lee et al., "DRAM-Aware Last-Level Cache Replacement", High Performance Systems Group, Dept. of Electrical & Computer Engineering, Univ of Texas at Austin, TR-HPS-2010-007, Dec. 2010, pp. 1-25.
M. Diaz Nava et al., "An Open Platform for Developing Multiprocessor SoCs", IEEE Computer, vol. 38, No. 7, pp. 60-67, Jul. 2005.

* cited by examiner

*Primary Examiner* — Gurtej Bansal
(74) *Attorney, Agent, or Firm* — Lee & Hayes, PLLC (57) ABSTRACT

A method for optimizing memory bandwidth using bank-based memory allocation is described. The method includes receiving a request for an allocation of memory. In response to receiving the request, memory is allocated to the request based on a performance ranking of memory banks in a plurality of memory banks. A performance ranking of a particular memory bank may be based at least in part on both a busyness and a row hit ratio of the particular memory bank. Apparatus and computer readable media are also described.

23 Claims, 3 Drawing Sheets

ALLOCATING MEMORY BASED ON PERFORMANCE RANKING

TECHNICAL FIELD

The exemplary and non-limiting embodiments of this invention relate generally to memory allocation systems, methods, devices and computer programs and, more specifically, relate to memory bank based allocations to optimize bandwidth.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A problem facing memory devices, for example, DRAM, is that the operational bandwidth may be more influenced by its configuration rather than just the peak bandwidth. The peak bandwidth rapidly increases between DRAM generations. For example, the LPDDR2 x32 200 MHz generation had a peak bandwidth of approximately 1600 MB/s, while the later LPDDR2 x32 400 MHz generation had a peak bandwidth of approximately 3200 MB/s.

With a bad bank allocation, the performance of a memory device can be very poor. When every access operation hits a different row in the same bank, a bad row hit ratio is experienced. For example, with LPDDR3 x32 800 MHz, this situation may give only 6% of the peak bandwidth. Typically, the memory bandwidth is expected to be 70% of the peak bandwidth. Thus, much less performance than expected is attained with bad memory space allocation.

Such problems may occur when using an open page policy such as commonly used in mobile systems. An open page policy leaves a page (e.g., a DRAM row) open after an access operation so that future accesses to the same page do not need to wait for the row to get re-opened. As a corollary, adding faster memories (and/or newer memories) does not improve the performance for such bank accesses. That is, newer and higher rated memories provide relatively less benefit.

Typically, the main memory is reserved by an operating system (OS). With current operating systems, the memory is reserved mainly from subsequent locations in order to keep the allocated memory space continuous. This has the effect that the memory bank usage balancing (and thus memory performance) depends mainly on the address mapping used. Some commonly used mappings are Bank-Row-Column (BRC) and Row-Bank-Column (RBC).

Contemporary memory systems may try to solve the problems encountered with bad allocations by usage of cache memories. More data than wanted is accessed from the main memory to a cache memory. It is hoped, that that excess data is needed in future accesses. However, if that data is not needed, it only consumes extra power, takes DRAM processing time and consumes cache memory (with the useless data in the cache).

Another way used to try to solve these problems is to increase the total amount of banks. Today, DRAM's may have 2, 4 or 8 banks per die, but other devices, like ones based on recent DRAM standards or Rambus XDR DRAM, may have 16 or 32 banks. In multi-channel memories, the total number of banks may be increased, but the number of banks per channel stays the same or even decreases. However, as mentioned above, increasing the number of banks does not improve the worst case scenarios.

Other techniques to solve the problem include trying to detect abnormal memory functionality in order to correct the memory operation before a system crash; however, a bad memory allocation is not considered an abnormal memory functionality.

A DRAM memory controller may be introduced which includes a page-tracking buffer (PTB). The PTB keeps track of open pages in the memory system. Unfortunately, this open page does not address the issue where bad memory allocation causes unacceptable performance.

Data elements may be interleaved across different banks. Those data element can then be accessed in parallel from several banks. SRAM memory may allow parallel accesses. However, this does not improve DRAM memory bandwidth.

What is needed is a way to optimize memory bank bandwidth using memory bank based allocations.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method for optimizing memory bandwidth using bank-based memory allocation. The method includes receiving a request for an allocation of memory. In response to receiving the request, memory is allocated to the request based on a performance ranking of memory banks in a plurality of memory banks. A performance ranking of a particular memory bank may be based at least in part on both a busyness and a row hit ratio of the particular memory bank.

In a further aspect thereof an exemplary embodiment of this invention provides an apparatus for optimizing memory bandwidth using bank-based memory allocation. The apparatus includes at least one processor; and at least one memory including computer program code. The at least one memory and the computer program code are configured to, with the at least one processor, cause the apparatus to perform actions. The actions include receiving a request for an allocation of memory. In response to receiving the request, memory is allocated to the request based on a performance ranking of memory banks in a plurality of memory banks.

In another aspect thereof an exemplary embodiment of this invention provides a computer readable medium for optimizing memory bandwidth using bank-based memory allocation. The computer readable medium is tangibly encoded with a computer program executable by a processor to perform actions. The actions include receiving a request for an allocation of memory. In response to receiving the request, memory is allocated to the request based on a performance ranking of memory banks in a plurality of memory banks.

In a further aspect thereof an exemplary embodiment of this invention provides an apparatus for optimizing memory bandwidth using bank-based memory allocation. The apparatus includes means for receiving a request for an allocation of memory. The apparatus also includes means for allocating memory to the request based on a performance ranking of memory banks in a plurality of memory banks in response to receiving the request.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Various exemplary embodiments in accordance with this invention make it possible to get better memory performance from memory devices. Additionally, the shorter access times provide better energy efficiency. Therefore, more value may be received from new and expensive memory components.

Figure 2:
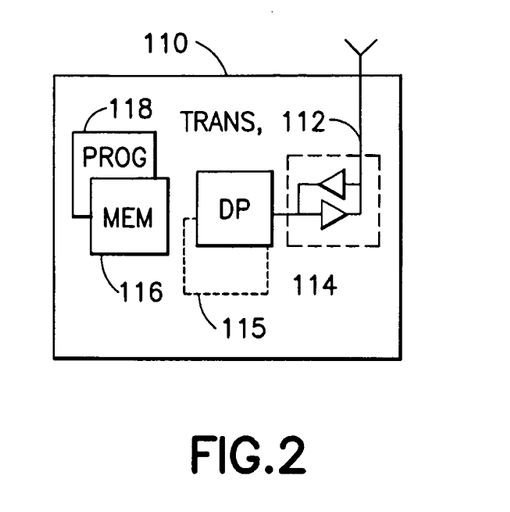
FIG. 2 shows a simplified block diagram of another exemplary electronic device that is suitable for use in practicing various exemplary embodiments of this invention.

Before describing in further detail various exemplary embodiments of this invention, reference is made to FIG. 2 for illustrating a simplified block diagram of an electronic device and apparatus that is suitable for use in practicing exemplary embodiments of this invention.

In FIG. 2, a device 110 includes a controller, such as a computer or a data processor (DP) 114 and a computer-readable memory medium embodied as a memory (MEM) 116 that stores data and a program of computer instructions (PROG) 118. The device may also include a suitable wireless interface, such as radio frequency (RF) transceiver 112, for bidirectional wireless communications with a network.

The PROG 118 is assumed to include program instructions that, when executed by the associated DP, enables the device to operate in accordance with exemplary embodiments of this invention, as will be discussed below in greater detail.

That is, various exemplary embodiments of this invention may be implemented at least in part by computer software executable by the DP 114 of the device 110, or by hardware, or by a combination of software and hardware (and firmware).

The device 110 may also include dedicated processors, for example, a memory management unit (MMU) 115.

In general, the various embodiments of the device 110 can include, but are not limited to, cellular telephones, tablets, personal digital assistants (PDAs), portable computers, image capture devices such as digital cameras, gaming devices, music storage and playback appliances, Internet appliances permitting wireless Internet access and browsing, as well as portable units or terminals that incorporate combinations of such functions.

The computer readable MEMs 116 may be of any type suitable to the local technical environment and may be implemented using any suitable data storage technology, such as DRAM memory, semiconductor based memory devices, flash memory, magnetic memory devices and systems, optical memory devices and systems, fixed memory and removable memory. The DP 114 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 112) may be of any type suitable to the local technical environment and may be implemented using any suitable communication technology such as individual transmitters, receivers, transceivers or a combination of such components.

Various exemplary embodiments in accordance with this invention use bank-based memory allocation to optimize memory performance. This gives more flexibility to configure the memory devices and provides additional options when using memory banks.

In an exemplary embodiment in accordance with this invention, when an application asks for more memory (e.g., when reserving the memory), the reserved memory is mapped according to the current operation conditions. The system may follow (e.g., by logging) the following parameters: a row hit ratio (also called page hit ratio) in each memory bank (e.g., the relative amount of accesses that hit the same, already open, row) and a measure of the memory bank busyness (e.g., how much the memory bank is actively accessing data). Busyness may also represent the time a bank is busy reading/writing data per the total time window. The memory bank busyness may also be estimated by the average bandwidth of the memory bank (e.g., in Mbit/s) compared to the peak bandwidth of the memory bank.

Based on the history of bank busyness and row hit ratio, there can be four different types of memory bank ranks: type 1—high bank busyness and high row hit ratio; type 2—low bank busyness and high row hit ratio; type 3—high bank busyness and low row hit ratio; and type 4—low bank busyness and low row hit ratio.

The memory reservation may then be performed based on whether enough memory of the preferred type is available to satisfy the request. For example, additional memory space should be primarily reserved from type 2 first, then type 4 and type 1 and finally from type 3. Accordingly, memory is allocated primarily from banks that are not already in heavy use. This also reduces the chance that banks that are already performing poorly are used for such allocations.

In order to avoid page table size increases, the physical memory may be allocated in continuous blocks. For example, a lower ranked type of memory may be used to satisfy the request with a single block of continuous memory rather than using multiple blocks of non-continuous memory of a higher ranked type of memory.

Ranking the memory banks may be performed, for example, at regular intervals, when the device is idle, or by continuously following/logging the performance characteristics of the device. Continuous logging uses more processing time and extra energy but more can be achieved with the memory and the performance rankings are more responsive to changes in use.

Figure 3:
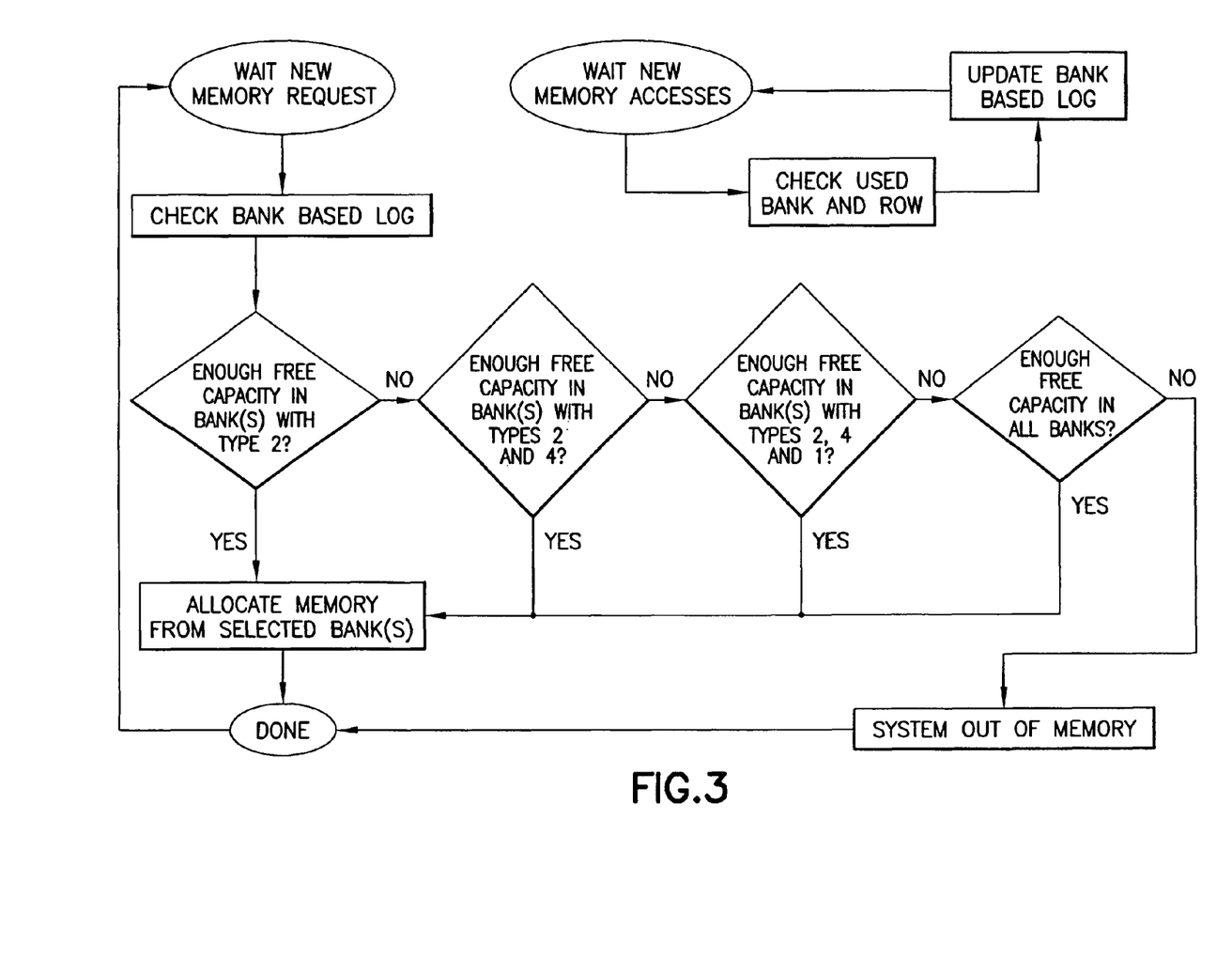
FIG. 3 is a logic flow diagram that illustrates the operation of an exemplary method, and a result of execution of computer program instructions embodied on a computer readable memory, in accordance with various exemplary embodiments of this invention.

FIG. 3 is a logic flow diagram that illustrates the operation of an exemplary method, and a result of execution of computer program instructions embodied on a computer readable memory, in accordance with various exemplary embodiments of this invention. At first, the system waits for a new memory request. After a memory request is received, bank based log information is checked. Based on that information, which banks are used to allocate the requested capacity are defined as follows:

1. If memory banks with type 2 have enough capacity, select the memory from those banks with type 2.

2. If not, but if memory banks with types 2 and 4 have enough capacity, select the memory from the combination of bank types 2 and 4.

3. If not, but if memory banks with types 2, 4, and 1 have enough capacity, select the memory from the combination of these three bank types.

4. If not, but if all memory banks have enough capacity, select the memory from any banks.

The selected memory banks are then used to allocate the requested memory capacity. If possible, the system typically attempts to allocate as continuous a memory space for the request as possible.

As depicted in FIG. 3, the bank based log is updated based on the accessed memory locations (e.g., in parallel with the above described functionality).

Figure 1:
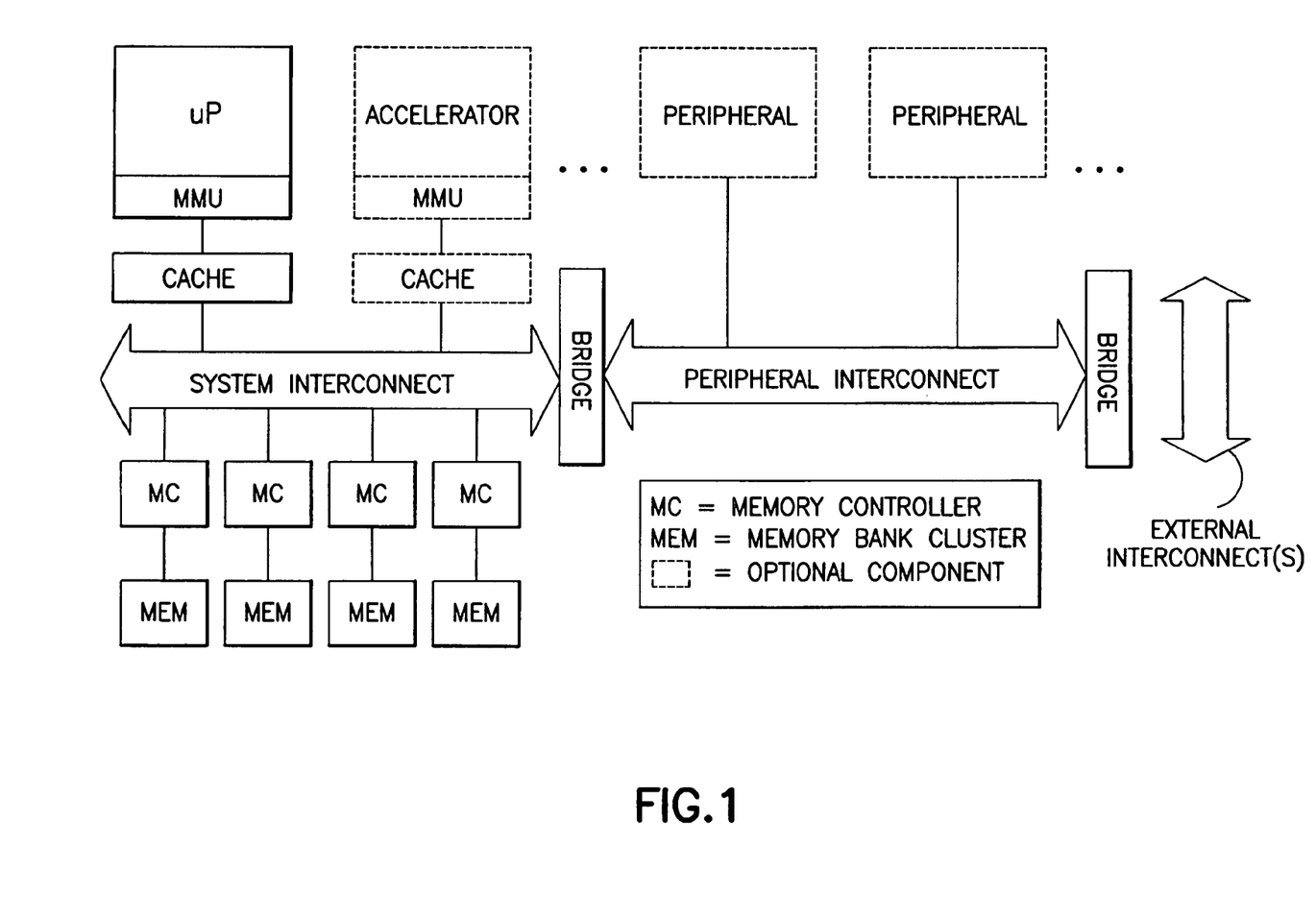
FIG. 1 shows a simplified block diagram of an exemplary electronic device that is suitable for use in practicing various exemplary embodiments of this invention.

FIG. 1 shows a simplified block diagram of an exemplary electronic device that is suitable for use in practicing various exemplary embodiments of this invention. The device includes a multichannel memory and a microprocessor (uP). Four channels are shown. However, the number of channels may be more or less than those shown.

A further exemplary embodiment of the logging information, the bank busyness and row hit ratio in each bank for each memory channel may be logged separately. Moreover, the bank busyness and row hit ratio in each bank for each page/row may be logged separately. Furthermore, memory sections(s) that a single program/process/unit is using is/are said to form a single memory context. The bank busyness and row hit ratio in each bank for each memory context may be logged separately. All information details may be taken account when allocating the requested memory capacity.

Another exemplary embodiment in accordance with this invention provides run-time remapping of the memory. While, the above described method allows allocating new memory portions in an efficient manner to achieve improved performance, it does not necessarily improve allocations already present in memory (e.g., in response to changes in memory use). In order to provide improved performance of existing memory allocations, run-time remapping of the memory may be performed.

Run-time memory operations may be monitored and remapping memory space is performed as desired (e.g., during idle periods, at regular intervals, etc.). As above, the monitored parameters include row hit ratio and busyness of all the banks. For each of the bank, the following are performed:

1. If the bank has a high bank busyness and a high row hit ratio (type 1), it is in a good situation and nothing has to be done. Furthermore, additional memory reservations may be avoided since the performance may worsen if the row hit ratio decreases.

2. If the bank has a low bank busyness and a high row hit ratio (type 2), it is also in a good situation and nothing has to be done.

3. If the bank has a high bank busyness and a low row hit ratio (type 3), it is not in an acceptable situation. Part of the memory space may be remapped to another bank. The remapped memory part (from the type 3 bank) may be selected based on some criteria. For example, the smallest capacity memory context may be the part that is remapped. As another example, the memory context having the worst row hit ratio may be the part that is remapped. As a further example, a page/row having the worst row hit ratio may be the part that is remapped. The selected memory part is remapped to a bank of type 2 (primarily). Secondarily, part of the memory space may be remapped to a bank of type 4. In the selection of the target bank, a memory channel may also be used as a criterion.

4. If the bank has a low bank busyness and a low row hit ratio (type 4), it is acceptable situation and nothing has to be done.

The run-time remapping may be performed as follows: firstly, a new memory area is reserved from the specified type of destination memory bank. Secondly, old data in the memory bank being remapped is stored to the new memory area. Then, the memory address space is remapped (e.g., in a memory management unit, MMU). Finally, the data in the old memory bank being remapped is erased. The erasing may not need to be a physical operation (e.g., rewriting all the memory cells), as just removing the old references may be enough to allow memory reuse.

The memory space remapping may be started based on any one of a number of triggers. The memory space may be remapped at regular intervals or when the memory experiences a period of relative idleness. Alternatively (or in addition), when a sufficient number of memory banks encounter an undesirable condition (e.g., being categorized as type 3) the memory controller may force remapping. Also, the controller may initiate remapping if the memory device, as a whole, meets/violates various thresholds, such as a minimal bandwidth threshold.

Based on the foregoing it should be apparent that the exemplary embodiments of this invention provide a method, apparatus and computer progam(s) to optimize bandwidth using bank-based memory allocation.

Figure 4:
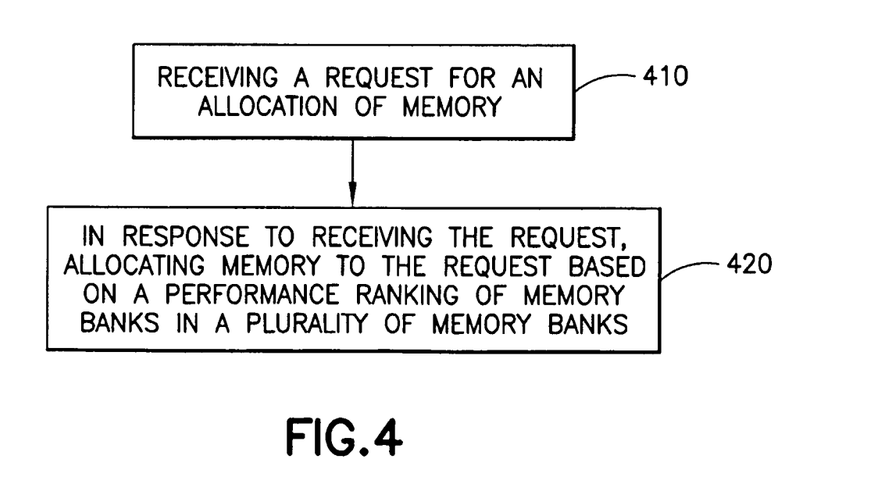
FIG. 4 is a logic flow diagram that illustrates the operation of another exemplary method, and a result of execution of computer program instructions embodied on a computer readable memory, in accordance with various exemplary embodiments of this invention.

FIG. 4 is a logic flow diagram that illustrates the operation of another exemplary method, and a result of execution of computer program instructions embodied on a computer readable memory, in accordance with various exemplary embodiments of this invention. In accordance with these exemplary embodiments a method performs, at Block 410, a step of receiving a request for an allocation of memory. At Block 420, in response to receiving the request, the method performs a step of allocating memory to the request based on a performance ranking of memory banks in a plurality of memory banks.

The various blocks shown in FIGS. 3 and 4 may be viewed as method steps, and/or as operations that result from operation of computer program code, and/or as a plurality of coupled logic circuit elements constructed to carry out the associated function(s).

An exemplary embodiment in accordance with this invention is a method for optimizing memory bandwidth using bank-based memory allocation. The method includes receiving (e.g., by a receiver) a request for an allocation of memory. In response to receiving the request, memory is allocated (e.g., by a processor) to the request based on a performance ranking of memory banks in a plurality of memory banks.

In a further exemplary embodiment of the method above, a performance ranking of a particular memory bank is based at least in part on both a busyness and a row hit ratio of the particular memory bank.

In an additional exemplary embodiment of the method above, the row hit ratio represents a relative amount of operations accessing a same, already open, row within the memory bank.

In a further exemplary embodiment of any one of the methods above, the busyness is a ratio of time the memory bank is accessed during a window of time or a ratio of average bandwidth of the memory bank per peak bandwidth of the memory bank.

In an additional exemplary embodiment of any one of the methods above, memory banks with a low busyness and a high row hit ratio are ranked for primary use. Allocating the memory includes, in response to determining that memory banks ranked for primary use are sufficiently available, allocating memory from the memory banks ranked for primary use.

In a further exemplary embodiment of the method above, memory banks with a low busyness and a low row hit ratio are ranked for secondary use when no memory banks ranked for primary use are sufficiently available.

In an additional exemplary embodiment of the method above, memory banks with a high busyness and a high row hit ratio are ranked for tertiary use when no memory banks ranked for primary use and no memory banks ranked for secondary use are sufficiently available.

In a further exemplary embodiment of the method above, memory banks with a high busyness and a low row hit ratio are ranked for use when no other ranked memory banks are sufficiently available.

In an additional exemplary embodiment of any one of the methods above, allocating the memory comprises allocating continuous memory locations from a memory bank.

In a further exemplary embodiment of any one of the methods above, the method also includes monitoring operations accessing the plurality of memory banks; and determining, based on the monitored operations, an updated busyness and an updated row hit ratio for accessed memory banks in the plurality of memory banks.

In an additional exemplary embodiment of the method above, the method also includes, in response to determining the updated busyness and the updated row hit ratio for a first memory bank is a high busyness and a low row hit ratio, moving at least a portion of data stored in the first memory bank to at least one of a second memory bank and a third memory bank. The second memory bank having a low busyness and a high row hit ratio and the third memory bank having a low busyness and a low row hit ratio.

A further exemplary embodiment in accordance with this invention is an apparatus for optimizing memory bandwidth using bank-based memory allocation. The apparatus includes at least one processor; and at least one memory including computer program code. The at least one memory and the computer program code are configured to, with the at least one processor, cause the apparatus to perform actions. The actions include receiving a request for an allocation of memory. In response to receiving the request, memory is allocated to the request based on a performance ranking of memory banks in a plurality of memory banks.

In an additional exemplary embodiment of the apparatus above, a performance ranking of a particular memory bank is based at least in part on both a busyness and a row hit ratio of the particular memory bank.

In a further exemplary embodiment of the apparatus above, the row hit ratio represents a relative amount of operations accessing a same, already open, row within the memory bank.

In an additional exemplary embodiment of any one of the apparatus above, the busyness is a ratio of time the memory bank is accessed during a window of time or a ratio of average bandwidth of the memory bank per peak bandwidth of the memory bank.

In a further exemplary embodiment of any one of the apparatus above, memory banks with a low busyness and a high row hit ratio are ranked for primary use. The at least one memory and the computer program code are further configured to cause the apparatus, when allocating the memory, to allocate memory from the memory banks ranked for primary use in response to determining that memory banks ranked for primary use are sufficiently available.

In an additional exemplary embodiment of the apparatus above, memory banks with a low busyness and a low row hit ratio are ranked for secondary use when no memory banks ranked for primary use are sufficiently available.

In a further exemplary embodiment of the apparatus above, memory banks with a high busyness and a high row hit ratio are ranked for tertiary use when no memory banks ranked for primary use and no memory banks ranked for secondary use are sufficiently available.

In an additional exemplary embodiment of the apparatus above, memory banks with a high busyness and a low row hit ratio are ranked for use when no other ranked memory banks are sufficiently available.

In a further exemplary embodiment of any one of the apparatus above, the at least one memory and the computer program code are further configured to cause the apparatus, when allocating the memory, to allocate continuous memory locations from a memory bank.

In an additional exemplary embodiment of any one of the apparatus above, the actions also includes monitoring operations accessing the plurality of memory banks; and determining, based on the monitored operations, an updated busyness and an updated row hit ratio for accessed memory banks in the plurality of memory banks.

In a further exemplary embodiment of the apparatus above, the actions also include, in response to determining the updated busyness and the updated row hit ratio for a first memory bank is a high busyness and a low row hit ratio, moving at least a portion of data stored in the first memory bank to at least one of a second memory bank and a third memory bank. The second memory bank having a low busyness and a high row hit ratio and the third memory bank having a low busyness and a low row hit ratio.

In an additional exemplary embodiment of any one of the apparatus above, the apparatus is embodied in an integrated circuit and/or a mobile device.

A further exemplary embodiment in accordance with this invention is a computer readable medium for optimizing memory bandwidth using bank-based memory allocation. The computer readable medium is tangibly encoded with a computer program executable by a processor to perform actions. The actions include receiving a request for an allocation of memory. In response to receiving the request, memory is allocated to the request based on a performance ranking of memory banks in a plurality of memory banks.

In an additional exemplary embodiment of the computer readable medium above, a performance ranking of a particular memory bank is based at least in part on both a busyness and a row hit ratio of the particular memory bank.

In a further exemplary embodiment of the computer readable medium above, the row hit ratio represents a relative amount of operations accessing a same, already open, row within the memory bank.

In an additional exemplary embodiment of any one of the computer readable media above, the busyness is a ratio of time the memory bank is accessed during a window of time or a ratio of average bandwidth of the memory bank per peak bandwidth of the memory bank.

In a further exemplary embodiment of any one of the computer readable media above, memory banks with a low busyness and a high row hit ratio are ranked for primary use. The at least one memory and the computer program code are further configured to cause the apparatus, when allocating the memory, to allocate memory from the memory banks ranked for primary use in response to determining that memory banks ranked for primary use are sufficiently available.

In an additional exemplary embodiment of the computer readable medium above, memory banks with a low busyness and a low row hit ratio are ranked for secondary use when no memory banks ranked for primary use are sufficiently available.

In a further exemplary embodiment of the computer readable medium above, memory banks with a high busyness and a high row hit ratio are ranked for tertiary use when no memory banks ranked for primary use and no memory banks ranked for secondary use are sufficiently available.

In an additional exemplary embodiment of the computer readable medium above, memory banks with a high busyness and a low row hit ratio are ranked for use when no other ranked memory banks are sufficiently available.

In a further exemplary embodiment of any one of the computer readable media above, the at least one memory and the computer program code are further configured to cause the apparatus, when allocating the memory, to allocate continuous memory locations from a memory bank.

In an additional exemplary embodiment of any one of the computer readable media above, the actions also includes monitoring operations accessing the plurality of memory banks; and determining, based on the monitored operations, an updated busyness and an updated row hit ratio for accessed memory banks in the plurality of memory banks.

In a further exemplary embodiment of the computer readable medium above, the actions also include, in response to determining the updated busyness and the updated row hit ratio for a first memory bank is a high busyness and a low row hit ratio, moving at least a portion of data stored in the first memory bank to at least one of a second memory bank and a third memory bank. The second memory bank having a low busyness and a high row hit ratio and the third memory bank having a low busyness and a low row hit ratio.

In an additional exemplary embodiment of any one of the computer readable media above, the computer readable medium is a non-transitory computer readable medium (e.g., CD-ROM, flash memory, RAM, etc.).

A further exemplary embodiment in accordance with this invention is an apparatus for optimizing memory bandwidth using bank-based memory allocation. The apparatus includes means for receiving (e.g., a receiver) a request for an allocation of memory. The apparatus also includes means for allocating (e.g., a processor) memory to the request based on a performance ranking of memory banks in a plurality of memory banks in response to receiving the request.

In an additional exemplary embodiment of the apparatus above, a performance ranking of a particular memory bank is based at least in part on both a busyness and a row hit ratio of the particular memory bank.

In a further exemplary embodiment of the apparatus above, the row hit ratio represents a relative amount of operations accessing a same, already open, row within the memory bank.

In an additional exemplary embodiment of any one of the apparatus above, the busyness is a ratio of time the memory bank is accessed during a window of time or a ratio of average bandwidth of the memory bank per peak bandwidth of the memory bank.

In a further exemplary embodiment of any one of the apparatus above, memory banks with a low busyness and a high row hit ratio are ranked for primary use. The allocating means includes, means for allocating memory from the memory banks ranked for primary use in response to determining that memory banks ranked for primary use are sufficiently available.

In an additional exemplary embodiment of the apparatus above, memory banks with a low busyness and a low row hit ratio are ranked for secondary use when no memory banks ranked for primary use are sufficiently available.

In a further exemplary embodiment of the apparatus above, memory banks with a high busyness and a high row hit ratio are ranked for tertiary use when no memory banks ranked for primary use and no memory banks ranked for secondary use are sufficiently available.

In an additional exemplary embodiment of the apparatus above, memory banks with a high busyness and a low row hit ratio are ranked for use when no other ranked memory banks are sufficiently available.

In a further exemplary embodiment of any one of the apparatus above, the allocating means includes means for allocating continuous memory locations from a memory bank.

In an additional exemplary embodiment of any one of the apparatus above, the apparatus also includes means for monitoring operations accessing the plurality of memory banks; and means for determining, based on the monitored operations, an updated busyness and an updated row hit ratio for accessed memory banks in the plurality of memory banks.

In a further exemplary embodiment of the apparatus above, the apparatus also includes, means for moving at least a portion of data stored in the first memory bank to at least one of a second memory bank and a third memory bank in response to determining the updated busyness and the updated row hit ratio for a first memory bank is a high busyness and a low row hit ratio. The second memory bank having a low busyness and a high row hit ratio and the third memory bank having a low busyness and a low row hit ratio.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of DRAM memory, it should be appreciated that the exemplary embodiments of this invention are not limited for use with only this one particular type of memory, and that they may be used to advantage in other memories such as for example flash memory and multichannel memory.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving a request for an allocation of memory;
   determining performance rankings of a plurality of memory banks of the memory, wherein the performance rankings of the plurality of memory banks are based at least in part on both busyness measures of the plurality of memory banks and row hit ratios of the plurality of memory banks; and
   in response to receiving the request, allocating at least a portion of at least one of the plurality of memory banks based on a comparison of the performance rankings of at least two of the plurality of memory banks.

2. The method of claim 1, where the row hit ratios of the plurality of memory banks represent relative amounts of operations accessing already open rows within the plurality of memory banks.

3. The method of claim 1, where the busyness measures of the plurality of memory banks are ratios of (i) amounts of time that ones of the plurality of memory banks are accessed during one or more windows of time to (ii) lengths of the one or more windows of time.

4. The method of claim 1, where allocating the at least a portion of at least one of the plurality of memory banks comprises allocating continuous memory locations from a memory bank.

5. The method of claim 1, where the busyness measures of the plurality of memory banks are ratios of average bandwidths of the plurality of memory banks to peak bandwidths of the plurality of memory banks.

6. The method of claim 1, where the allocating to the request includes allocating to the request portions of more than one of the plurality of memory banks based on the comparison.

7. The method of claim 1, further comprising:
   monitoring operations that access the plurality of memory banks; and
   determining, based on the monitored operations, updated busyness measures and updated row hit ratios for accessed memory banks in the plurality of memory banks.

8. The method of claim 7, where, in response to determining that the updated busyness measure and the updated row hit ratio for a first memory bank is a high busyness and a low row hit ratio, respectively, moving at least a portion of data stored in the first memory bank to at least one of a second memory bank or a third memory bank, the second memory bank having a low busyness and a high row hit ratio, and the third memory bank having a low busyness and a low row hit ratio.

9. The method of claim 1, where at least a first one of the plurality of memory banks with a low busyness measure and a high row hit ratio is ranked for primary use.

10. The method of claim 9, where at least a second one of the plurality of memory banks with a low busyness measure and a low row hit ratio is ranked for secondary use.

11. The method of claim 10, where at least a third one of the plurality of memory banks with a high busyness measure and a high row hit ratio is ranked for tertiary use.

12. The method of claim 11, where at least a fourth one of the memory banks with a high busyness measure and a low row hit ratio is ranked for use when none of the plurality memory banks that are ranked for primary use, secondary use, or tertiary use are sufficiently available.

13. An apparatus, comprising at least one processor; and at least one memory including computer program code, the at least one memory and the computer program code configured to, with the at least one processor, cause the apparatus to:
   receive a request for an allocation of memory;
   determine performance ranks for a plurality of memory banks of the memory, wherein the performance ranks of the plurality of memory banks are based at least in part on both busyness measures of the plurality of memory banks and row hit ratios of the plurality of memory banks; and
   in response to receiving the request, allocate to the request at least a portion of at least one of the plurality of memory banks based on a comparison of the performance ranks of at least two of the plurality of memory banks.

14. The apparatus of claim 13, where at least a first one of the plurality of memory banks with a low busyness measure and a high row hit ratio is ranked for primary use.

15. The apparatus of claim 13, where the at least one memory and the computer program code are further configured to cause the apparatus to:
   monitor operations that access the plurality of memory banks; and
   determine, based on the monitored operations, updated busyness measures and updated row hit ratios for accessed memory banks in the plurality of memory banks.

16. The apparatus of claim 13, where the at least one memory and the computer program code are further configured to, with the at least one processor, cause the apparatus to allocate to the request portions of more than one of the plurality of memory banks based on the comparison.

17. The apparatus of claim 13, where the computer program code is further configured to, with the at least one processor, cause the apparatus to identify:
   memory banks for primary use based on a low busyness measure and a high row hit ratio, and
   memory banks for secondary use based on a low busyness measure and a low row hit ratio.

18. The apparatus of claim 17, where the computer program code is further configured to, with the at least one processor, cause the apparatus to identify:
   memory banks for tertiary use based on a high busyness measure and a high row hit measure, and memory banks for use when none of the plurality memory banks that are identified for primary use, secondary use, or tertiary use are sufficiently available.

19. A computer-readable medium tangibly encoded with computer program code executable by a processor to perform actions comprising:

receiving a request for an allocation of memory;

determining performance ranks of a plurality of memory banks of the memory, wherein the performance ranks of the plurality of memory banks are based at least in part on both busyness measures of the plurality of memory banks and row hit ratios of the plurality of memory banks; and in response to receiving the request, allocating to the request at least a portion of one of the plurality of memory banks based on a comparison of the performance ranks of at least two of the plurality of memory banks.

20. The computer-readable medium of claim 19, where at least a first one of the plurality of memory banks with a low busyness and a high row hit ratio is ranked for primary use.

21. The computer-readable medium of claim 19, where the actions further comprise:

monitoring operations that access the plurality of memory banks; and determining, based on the monitored operations, updated busyness measures and updated row hit ratios for accessed memory banks in the plurality of memory banks.

22. The computer-readable medium of claim 19, wherein the determining the performance ranks further includes identifying:

memory banks for primary use based on a low busyness measure and a high row hit ratio, and memory banks for secondary use based on a low busyness measure and a low row hit ratio.

23. The computer-readable medium of claim 19, wherein the actions further comprise allocating to the request at least portions of more than one of the plurality of memory banks based on the comparison.

* * * * *